Figure 1:
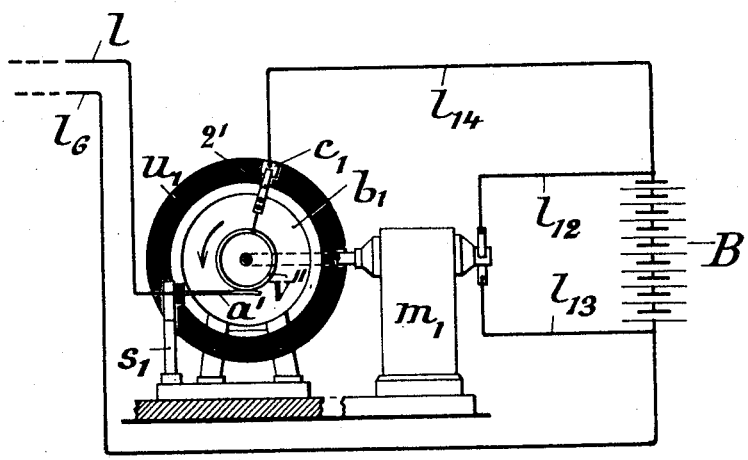

No. 784,447. PATENTED MAR. 7, 1905.
P. THOMAS.
MEANS FOR MAINTAINING SYNCHRONISM IN ELECTRIC MOTORS.
APPLICATION FILED MAR. 7, 1903.

WITNESSES
INVENTOR
Paul Thomas
by Georgii & Massie
his ATTORNEYS

No. 784,447. Patented March 7, 1905.

UNITED STATES PATENT OFFICE.

PAUL THOMAS, OF CHARLOTTENBURG, NEAR BERLIN, GERMANY.

MEANS FOR MAINTAINING SYNCHRONISM IN ELECTRIC MOTORS.

SPECIFICATION forming part of Letters Patent No. 784,447, dated March 7, 1905.

Application filed March 7, 1903. Serial No. 146,621.

*To all whom it may concern:*

Be it known that I, PAUL THOMAS, engineer, a subject of the German Emperor, residing at 243 Kurfürstendamm, Charlottenburg, near Berlin, Germany, have invented certain new and useful Improvements in Means for Maintaining Synchronism in Electric Motors; and I do hereby declare the following to be a full, clear, and exact description of the invention, such as will enable others skilled in the art to which it appertains to make and use the same.

My invention relates to electric motors, and has for its object to maintain the speed of such motors more exactly constant or synchronous with another motor than was hitherto possible with the usual means.

My invention is particularly applicable to printing telegraphy, multiplex telegraphy, and the like.

Whereas the usual method consists in applying a regulating force which is put into action when the speed of the motor deviates from a certain value, according to my present invention I preferably apply two forces, one of which is adapted to act upon very small and short deviations of speed and the other of which is called into play when deviations of longer duration take place. Moreover, my invention also comprises means for varying the regulating forces according to the degree of deviation which is to be compensated thereby.

More specifically stated, the invention consists in applying to the rotor of the machine to be regulated a regulating force, which may be a driving force or a retarding force and which is arranged so as to vary periodically between a minimum and a maximum value. The period of variation, however, is made so small that the total action of the varying force upon the rotor of the machine is constant. Moreover, according to my invention the arrangement is such that when the speed of the rotor is increased—the regulating force being, for instance, a retarding force—the periodic variations of the regulating force are automatically suppressed, and it remains for a time constantly at its maximum value until its retarding action, which is thus considerably increased, has taken effect and the rotor has returned to normal speed, whereupon the periodic action is reëstablished, or, vice versa, if the speed of the motor falls below the normal rate the periodic variations of the regulating force are suppressed, so as to keep it constant at its minimum value, the result being an increase of speed until synchronism, and with it the periodic action, is reëstablished. This plan I have found admirably adapted to the regulation of very small and short aberrations from normal speed; but when adjusted to follow such very small deviations the method does not sufficiently guarantee against larger variations of longer duration. In such cases, in which larger variations may be expected, I therefore also apply a second regulating force, which is also automatically put into action as soon as the periodic action of the first regulating force ceases and which, moreover, is variable in strength and is automatically varied so as to suit the amount of deviation.

In the accompanying diagrammatical drawings I have illustrated specific means for applying my system of regulation.

Figure 2:
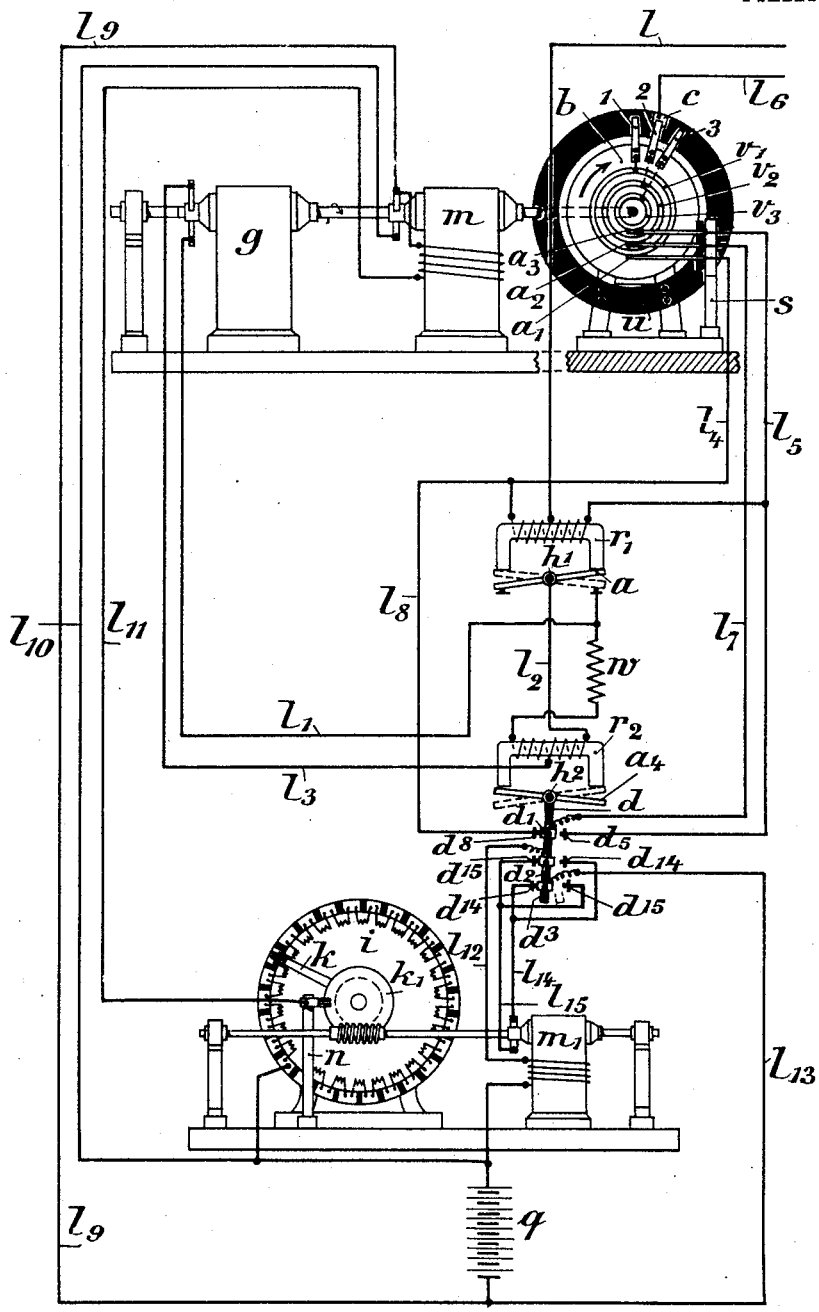

Figure 1 illustrates the parts and connections of the primary or transmitting station, and Fig. 2 the parts and connections of the secondary or receiving station.

In Fig. 2, $m$ is a motor which receives electric energy through conductors $l^9$ and $l^{10}$ from a battery or other suitable source of electric energy $q$. $g$ is a generator supposed to be directly coupled with $m$ and feeding into the conductors $l'$ and $l^2$. The opposite end of the shaft of the motor $m$ is supposed to be coupled with a disk $b$, carrying three contact-brushes 1, 2, and 3, adapted to make contact with a stationary contact-piece $c$, fixed on a stationary annular disk $a$, made of insulating material. The disk $b$ is provided with three contact-rings $v'$, $v^2$, and $v^3$, connected to the three brushes 1, 2, and 3, respectively, in the order of the indices, as indicated by dotted lines in the drawings. The three contact-rings $v'$, $v^2$, and $v^3$ coöperate with three brushes $a'$, $a^2$, and $a^3$, fixed in a standard $s$ and connected to conductors $l^3$, $l^4$, and $l^5$, respectively. The primary or transmitting station is supplied with an arrangement which is an almost exact copy of this device. It is illustrated in Fig. 1, and the same letters of reference are used to designate similar parts, though furnished with other indices. The source of electrical energy B, Fig. 1, is connected to a motor $m'$ by means of conductors $l^{12}$ and $l^{13}$. The motor $m'$ is coupled to a rotatable disk $b'$, provided with a spring-contact $2'$, adapted to coöperate with a stationary contact $c'$ on a stationary disk $u'$. The disk $b'$ carries a ring $v''$, coöperating with a brush $a'$, fixed in a standard $s'$. To this brush $a'$ is attached the distant end of the conductor $l$, the other end of which appears in Fig. 2. The other line conductor, $l^6$, is attached to one pole of the source of current B. The other pole is connected to $c'$ by means of conductor $l^{14}$. Between the free ends of conductors $l$ and $l^6$ the line is supposed to be inserted which connects the primary with the secondary station. Referring once more to Fig. 2, it will be seen that between conductors $l^4$ and $l^5$ is inserted the winding of an electromagnet $r'$, and at an intermediate point between the terminals of the winding the line conductor $l$ is attached. The other line conductor, $l^6$, is attached to the stationary contact-piece 2 on disk $u$. An armature $a$ is arranged to coöperate with the electromagnet $r'$, being hinged at its center so as to be able to take either of two positions, accordingly as the right or left half of the winding is excited, as is indicated on the drawings by dotted lines. The hinge supporting this armature is connected by a conductor $l^2$ with one end of the winding of a similar electromagnet $r^2$, the other end of the winding being connected through a resistance $w$ with the conductor $l'$. The intermediate point of attachment of this winding is connected to conductor $l^3$. The armature $a^1$ is likewise hinged at its center and is provided with an insulated rod $d$, carrying three contact-pieces $d'$, $d^2$, and $d^3$, connected by flexible conductors to the terminals of conductors $l^7$, $l^{12}$, and $l^{13}$, respectively. The contact-pieces $d'$, $d^2$, and $d^3$ are arranged to make contacts with the stationary contact-pieces $d^5$, $d^8$, $d^{14}$, $d^{14}$, and $d^{15}$ $d^{15}$, connected, respectively, to conductors $l^5$, $l^8$, $l^{14}$, and $l^{15}$. The two latter conductors lead to the brushes of a motor $m'$, which drives a worm and worm-wheel carrying a contact-lever $k$, the end of which is adapted to slide over the contacts of a rheostat $i$. One terminal of this rheostat is connected to conductor $l^{10}$, and thereby to the one end of the generator $q$, and the other is formed by a stationary brush $n$, connected to a conductor $l^{11}$, leading to the field-winding of the motor $m$. The brush $n$ coöperates with a disk $k'$, conductively connected with the lever $k$.

The operation of this arrangement is as follows: The object of the arrangement is to keep the speed of the motor $m$ constant and in synchronism with motor $m'$ at the primary station, supposed to be running at the distant end of the line $l\,l^6$. At every revolution of the transmitting-motor $m'$ one current impulse is sent along the line $l\,l^6$. All parts are supposed to be arranged in such a way that contact-brush 2 touches stationary contact $c$ at the same moment in which the regulating-current impulse is transmitted along the line, provided that synchronism between the transmitting and receiving motors obtains. Assuming this state of things to last, the arrangement will operate as follows: The impulse coming from $l^6$ will pass over contact $c$, brush 2, ring $v^2$, brushes $a^2$ $l^7$ $d'$ $l^8$, the left half of the winding of $r'$, and through $l$ back to the transmitter. The armature $a$ will therefore be rocked into the position indicated by dotted lines, and the resistance $w$ will thereby be short-circuited. It will be remarked that this resistance is inserted in the external circuit of the generator $g$, from which the current was passing over $l^3$, left half of winding of electromagnet $r^2$, resistance $w$, and $l'$. By short-circuiting $w$ this current is induced to take its path through the right half of the winding of the electromagnet $r^2$, over $l^2$ and armature $a$, directly to $l'$. Thus, also, the armature $a^1$ of the electromagnet $r^2$ is rocked into the position indicated by dotted lines. Therefore when the motor $m$, and with it the disk $b$, performs its next revolution and the contact-brush 2 again reaches the stationary contact $c$ the following regulating-current impulse arriving at this moment will pass from $l^6$ over $c$, 2, $v^2$, $l^7$, $d'$ to $l^5$ and thence over the right half of the winding of $r'$ to $l$. This impulse will therefore have the effect of rocking both armatures $a$ and $a^1$ back into the positions indicated by full lines, and the same play will be repeated as long as synchronism is maintained between the transmitting and receiving motors. The effect of this play will be that the resistance $w$ is periodically inserted in and cut out of the circuit of the generator $g$, or, with other words, the generator $g$ will be periodically released and loaded; but it is to be understood that the period of these alternate loadings and releasings is so short that the total effect is that of a constant drag on the speed of the motor $m$. Assuming now that the speed of $m$ is decreased by some influence, the next result will be that instead of brush 2 arriving at contact $c$ in the moment in which the regulating impulse is received this impulse will be received by brush 3. The impulse coming from $l^6$ will therefore pass over $c$ 3 $v^3$ $l^5$, right half of winding of $r'$, and back through $l$. If the armature $a$ were in the position indicated by dotted lines, it will be rocked into the opposite position, and if in that position it will remain. The generator $g$ will therefore remain permanently unloaded as long as this state of things obtains. As soon, however, as the motor $m$ has recovered its original speed brush 2 will again come into action, and the old play will be reëstablished. A similar action will take place if the speed of the motor $m$ surpasses synchronism. The result will be that brush 1 instead of brush 2 will receive the regulating impulse, and the latter will therefore pass from $l^6$ over $c$, contact-brush 1, ring $v'$, $l^4$, left half of winding of $r'$, and back to line conductor $l$, and the armature $a$ will be kept permanently in the position indicated in dotted lines until synchronism is reëstablished. Thus small deviations from synchronism will be effectively met and counteracted by a corresponding plus or minus of load on the motor $m$; but I have found that this arrangement is not sufficient in cases in which greater deviations and such that are of longer duration have to be dealt with. For this purpose the rheostat $i$ is provided, which is inserted in the field-winding of the motor $m$ and can be made to permanently accelerate or retard the motor, accordingly as more or less resistance is put in series with the field-winding, thus diminishing or increasing the excitation. The rheostat is actuated by the small motor $m'$, which is fed by the generator $q$. It will be understood from the connections indicated in the diagram that accordingly as the contact-arm $d$ takes the position indicated by dotted or that indicated by full lines the current in this motor $m'$ is reversed. During the normal action of the apparatus, therefore, the motor $m'$ will continually receive alternate impulses and will therefore remain inactive; but when the speed of the motor $m$ sinks below or rises above synchronism the armature $a^4$ will retain either of the two positions, and accordingly the motor $m'$ will be started and will run in either direction, thus increasing or diminishing the excitation of the field of $m$ until synchronism is reëstablished.

Instead of providing a generator, as $q$, coupled with the motor $m$ that is to be regulated and varying its load by alternately inserting and cutting out the resistance $w$, this resistance might also be employed to influence directly the driving force of $m$. This modification is not drawn, because its action will be readily understood by every expert when it is stated that for attaining this object it would only be necessary to leave out the generator, to cut through conductors $l^{10}$ or $l^{11}$, and to connect the free ends thus obtained to conductors $l'$ and $l^3$, respectively, thus placing $w$ in series with the field-winding of $m$.

Having now particularly described and ascertained the nature of my said invention and in what manner the same is to be performed, I declare that what I claim is—

1. The method of maintaining synchronism between a primary and a secondary rotating shaft, both shafts being independently driven, which method consists in transmitting periodic current impulses, from the station of the primary shaft to that of the secondary shaft, actuating by said impulses two separate regulating forces, one of said forces having a constant regulating effect upon the speed of the secondary shaft lasting for the time during which the said shaft deviates from synchronism and ceasing as soon as synchronism is reëstablished, the other of said two regulating forces having a variable regulating effect upon the speed of the secondary shaft beginning with the beginning of the deviation from synchronism and increasing until synchronism is reëstablished and then remaining constant at the value obtained at the moment of the reëstablishment of synchronism until a new deviation takes place.

2. The method of maintaining synchronism between a primary and a secondary rotating shaft both the shafts being independently driven, which method consists in transmitting periodic current impulses from the station of the primary shaft, to that of the secondary shaft, applying to the secondary shaft two regulating forces of which one increases and diminishes in regular periods that are short in relation to the duration of the deviations from synchronism and the other steadily increases, transforming the first regulating force into a constant force and starting the increase of the latter of the said two forces by means of the said current impulses whenever the secondary shaft deviates from synchronism, and retransforming the first regulating force into a periodically increasing and diminishing force and stopping the increase of the second regulating force by means of said current impulses so soon as synchronism is reëstablished.

In testimony whereof I have affixed my signature in presence of two witnesses.

PAUL THOMAS.

Witnesses:
HENRY HASPER,
WOLDEMAR HAUPT.